March 17, 1964 A. O. ROBERSON 3,125,040
CAR TRAY
Filed Nov. 1, 1962
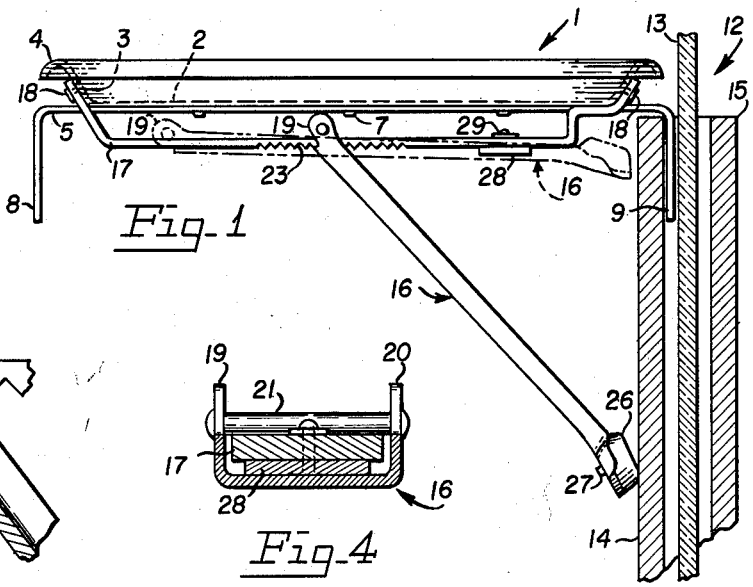
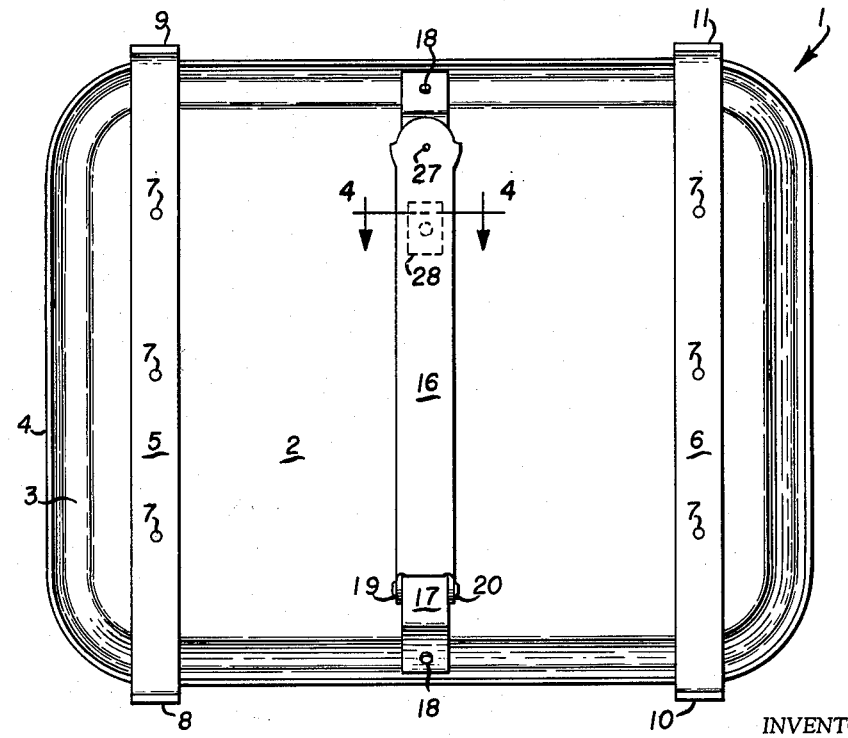
INVENTOR.
ALBERT O. ROBERSON
BY
Harvey S. Lauskurst 3,125,040
CAR TRAY
Albert O. Roberson, 873 Franklin St., Apt. 8,
Santa Clara, Calif.
Filed Nov. 1, 1962, Ser. No. 234,613
5 Claims. (Cl. 108—18)

This invention relates to trays and more particularly to trays of the type adapted to be removably attached to the door of a car.

Conventional car trays are designed to fit across the window opening of a car door when the window is down. The legs of the conventional tray engage one side of the door and a clamp arm of some sort engages the other side of the door. This conventional means of attaching the tray to the door thus requires that the window be down, and this is a particularly undesirable arrangement in inclement weather.

Accordingly, one of the objects of the invention is to provide a car tray which can be attached to the door of a car even when the window of the door is closed.

Another object of the invention is to provide a car tray which can not only be attached to a car door but will also stand level when placed on any flat level surface such as the bed of a station wagon.

A further object of the invention is to provide a car tray of the type described which is constructed so that several such trays can be nested in stacked position.

An addition object of the invention is to provide a car tray of the type having a movable clamp arm wherein a simple locking means holds the arm in position for attachment to a door. A related object is to provide a simple latch means for holding the clamp arm retracted.

Other and further objects and features of advantage will be apparent from the following detailed description wherein reference is made to the accompanying drawings in which:

FIGURE 1 is a side elevational view of a car tray according to the invention attached to a car door, the door being shown in cross section. The figure shows the clamp arm in the attachment position in full lines and in retracted position in dot-dash lines;

FIGURE 2 is a bottom plan view of the car tray, showing the clamp arm in retracted position;

FIGURE 3 is an enlarged view of a portion of the clamp arm and its guide rail and shows the clamp arm in cross section to provide a clear view of the locking mechanism in the position shown by solid lines in FIGURE 1; and FIGURE 4 is an enlarged sectional view taken on the line 4—4 of FIGURE 2.

Referring in more detail to the drawings, FIG. 1 shows a car tray 1 having a bottom 2. The tray is preferably dish-shaped to provide a shallow side wall 3 flanged over at the top to form a curved rim portion 4. The tray 1 is preferably made of aluminum, plastic, fiberglass or rubber covered wire.

The tray is provided with legs in the form of two leg-forming strips 5 and 6 attached to the bottom of the tray by rivets 7 or other suitable means. The strips 5 and 6 are bent down at their ends to form four legs 8–11. The material for the legs and leg-forming strips is preferably stainless steel or similar strong material. The reason for using a relatively strong material is that the legs 9 and 11 must be thinner than are the legs on a conventional car tray. The legs on a conventional car tray are designed to hang over the side of the car door so that there is no requirement for a limit on the thickness. As previously stated, the window must be rolled down for a conventional tray to be attached to the door.

In FIG. 1, numeral 12 designates a portion of a conventional car door having a glass window pane 13 movable vertically (by mechanism not shown) between two side panels 14 and 15. An important feature of the invention is the fact that legs 9 and 11 are thin enough to fit between the glass pane 13 and either of panels 14 and 15, depending on which side of the door one desires to place the tray. The advantage, of course, is that the tray according to the invention can be attached or remain attached when the window 13 is rolled up for comfort of the car occupants in cold or otherwise inclement weather. In order to accomplish this purpose, the thickness of legs 8 and 11 must be no greater than $\frac{1}{16}$ inch.

Obviously, only the two legs 9 and 11 are required to attach the tray to the side of a car door, and conventional car door trays have only two legs. However, according to the invention, the tray is provided with the two additional legs 8 and 10. This seemingly useless addition of two extra legs greatly increases the versatility of the tray as will now be pointed out. Legs 8 and 10 extend below the bottom of the tray the same amount as legs 9 and 11 so that the tray will stand level on any plane level surface. Thus, not only can the tray be used for attachment to a car door but it can also be used as a low table, for example on the bed of a station wagon. Also, the tray can stand by itself on a serving counter where it is loaded prior to delivery to a car. Another feature of the leg arrangement is that each of the legs is located outside the periphery of the tray. In this way the trays can be stored in a stacked nested arrangement, particularly when alternate trays are offset longitudinally so that legs of one tray do not abut the legs of the next lower tray in the stack.

In order to hold the tray firmly on a car door in the position shown in FIG. 1, the tray is provided with a clamp arm 16. The clamp arm is supported on the tray by means of a guide rail 17. The ends of the guide rail are bent upwardly and attached to the side wall 3 of the tray by rivets 18 or other suitable means. The configuration of rail 17 is such that it is suspended below the tray with an appreciable distance between the bottom of the tray and the top of the rail.

The clamp arm 16 is adjustable to accommodate a variety of car door shapes and to permit retraction of the clamp arm to the position shown by dot-dash lines in FIG. 1. More specifically, the clamp arm is supported on rail 17 in a manner which permits the arm to be moved along the rail as well as pivoted about the rail. In order to achieve this motion the arm is provided with support ears 19 and 20 projecting from one end of the arm in the form of a yoke straddling the rail 17. A pin 21 passes through apertures in ears 19 and 20 and is riveted over at its ends to secure it in place. The lower surface of rail 17 is provided with at least one, and preferably several, locking grooves 23 which are engaged by the end 24 of the clamp arm 16, as shown best in FIG. 3.

The connection between the clamp arm and guide rail has the advantage of providing a positive locking arrangement when the clamp arm is in use as shown in the full line position in FIG. 1. When it is desired to remove the tray, the side of the tray adjacent legs 8 and 10 is lifted slightly to disengage the end 24 of the clamp arm from the adjacent locking groove 23. Thereafter the arm 16 can be rotated upwardly and moved to the left to occupy the retracted position shown in dot-dash lines in FIG. 1. The arm 16 is preferably strengthened by forming it with a channel-shaped cross section to provide sides 25, as shown best in FIGS. 3 and 4. The channel shape is made wide enough for the sides 25 to fit around the rail 17 in the retracted position as shown best in FIG. 4.

In order to protect the car finish, the right end of arm 16 carries a cushioning member 26 of rubber or other suitable material attached by a screw 27 or other suitable connecting means.

The connecting means at the left end of arm 16 obviously permits the arm to pivot downwardly around the axis of pin 21 under the force of gravity. It is of course troublesome to have the arm swing downward when the tray is being carried, stored or used as a table. In order to overcome this difficulty a magnet 28 is attached to the undersurface of rail 17 by a screw 29 or other suitable means. This arrangement very simply holds the clamp arm 16 in the retracted position shown by dot-dash lines in FIG. 1. When it is desired to swing the arm downward into attachment position, the right end of the arm is grasped and a slight downward pull overcomes the force of magnet 28. Obviously, the magnet can be attached to the clamp arm instead of to the guide rail, and in either case the one to which it is not attached must be of magnetic material.

Although a preferred embodiment of the invention has been shown and described, it is to be understood that modifications may be made therein without departing from the spirit and scope of the invention as set forth in the appended claims.

What is claimed is:

1. A car tray comprising a tray having a bottom, four legs of equal length attached to said tray and projecting downwardly from said bottom, two of said legs being located adjacent each of two opposite sides of said tray, the two legs adjacent one of said sides being thin enough to fit in the space between the glass and adjacent frame on a car door, a guide rail and means suspending said rail below the bottom of the tray, a clamp arm having a cushioning pad adjacent one end, connecting means adjacent the other end of said arm permitting said arm to be pivoted about and slide along said rail, locking means on said rail engageable by said other end of the arm when the cushioned end of the arm is pivoted away from said rail, said arm being pivotal to a retracted position substantially parallel to said rail, said cushioned end of said arm being positioned adjacent said one side of the tray when the arm is in said retracted position, and magnetic catch means holding said arm and rail in said retracted position, the distance between the legs on opposite sides of the tray being greater than the width of the tray.

2. A car tray comprising a tray having a bottom, two leg-forming strips extending generally parallel to each other across the bottom of said tray and attached thereto, a downturned portion on each end of each of said strips forming four legs for said tray, the distance between the legs on opposite sides of the tray being greater than the width of the tray, a guide rail positioned under the bottom of said tray, a clamp arm having one end slidingly and pivotally engaged to said rail, said arm being of a length such that the other end of the arm extends substantially below said legs when the arm is pivoted away from the bottom of the tray, said rail including a plurality of locking grooves on its undersurface for securely locking said arm against sliding when said arm is pivoted away from the undersurface of said rail after the legs on one side of the tray are inserted into the space between the glass and adjacent frame of a car door and the other end is positioned against the outer surface of the car door to support said tray in a substantially horizontal position.

3. A car tray comprising a tray having a bottom, two legs attached to said tray and projecting downwardly from said bottom adjacent one side of said tray, a guide rail and means suspending said rail below the bottom of the tray, a clamp arm below said rail and having a pair of support ears projecting from one end thereof on opposite sides of the arm, said ears being positioned to straddle said rail, a pin connecting said ears and positioned between said rail and the bottom of said tray, said arm being pivotable about said pin and slidable along said rail, said arm being of a length such that the other end of the arm extends substantially below said legs when the arm is pivoted away from the bottom of the tray, and said rail having at least one locking groove on the undersurface thereof substantially parallel to and engageable by the end of said arm between said ears.

4. A car tray in accordance with claim 3 in which the undersurface of said rail is serrated to form a plurality of parallel locking grooves.

5. A car tray in accordance with claim 4 in which said rail includes a magnetic clutch means for holding said arm to the undersurface of said rail when said arm is in its retracted position.

References Cited in the file of this patent

UNITED STATES PATENTS

| | | |
|---|---|---|
| 1,198,227 | Hinchey | Sept. 12, 1916 |
| 1,934,271 | McGinley | Nov. 7, 1933 |
| 2,296,028 | Gribble | Sept. 15, 1942 |
| 2,521,885 | Vasquez | Sept. 12, 1950 |